United States Patent Office 2,741,491
Patented Apr. 10, 1956

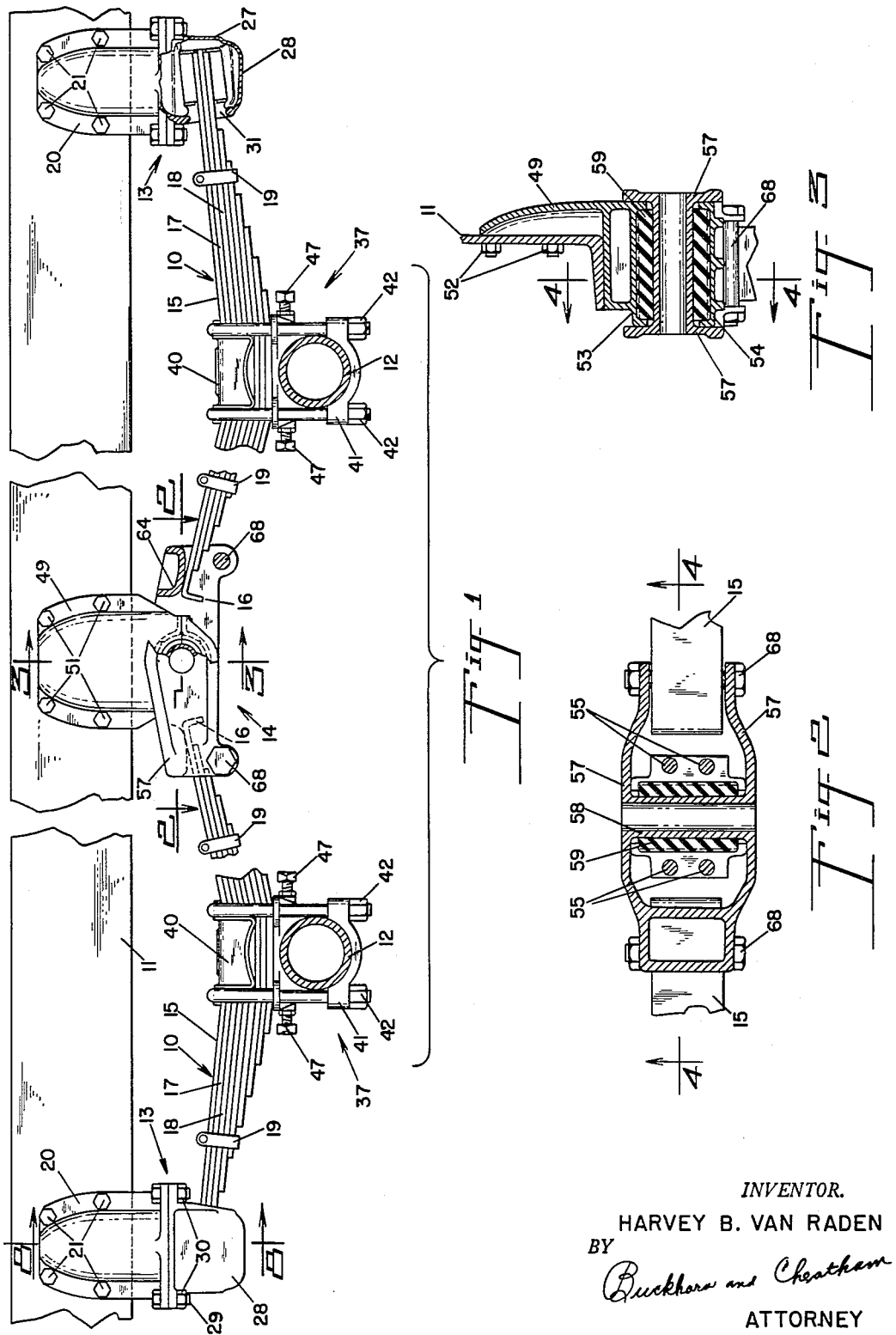

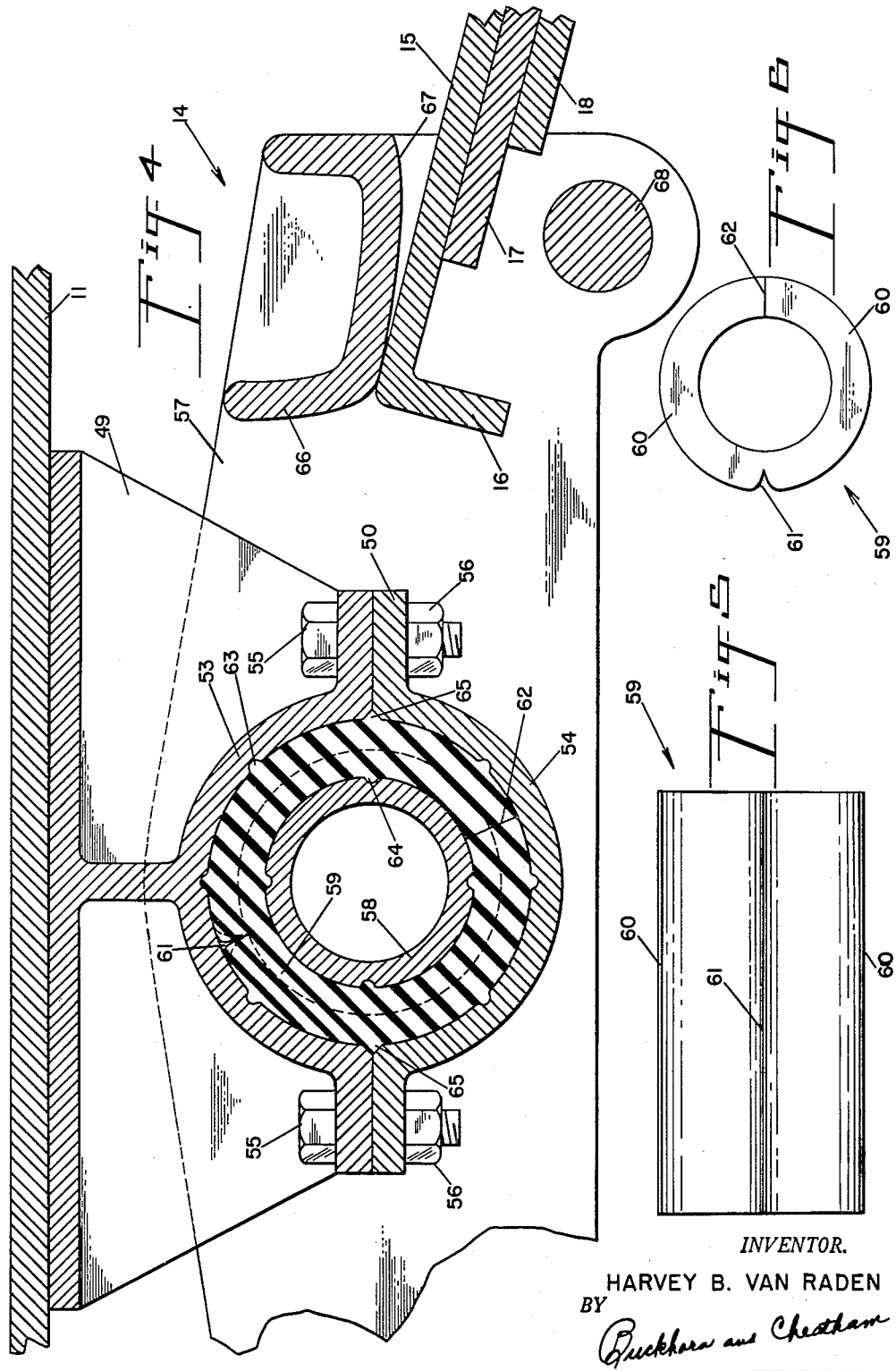

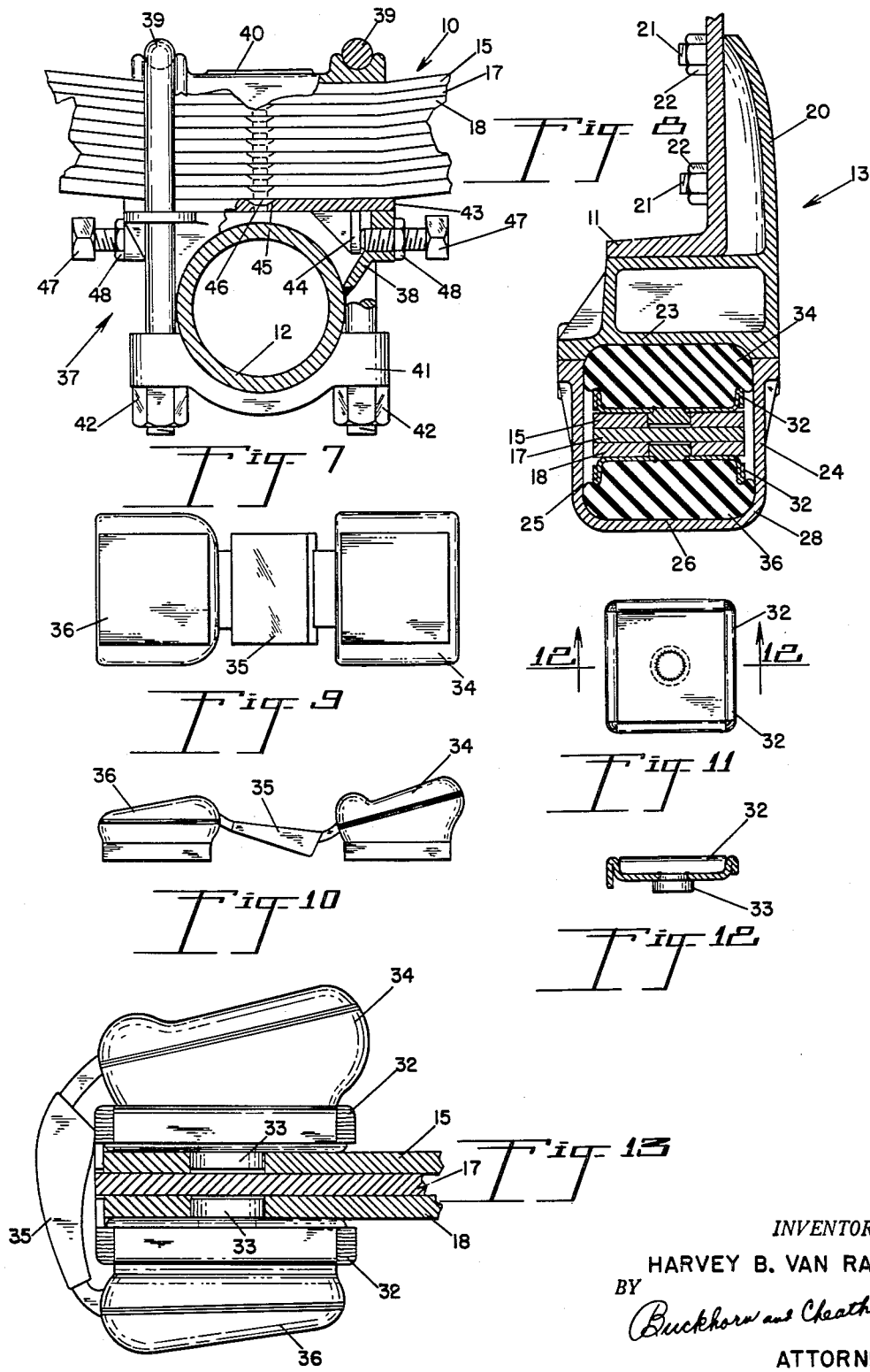

2,741,491

TANDEM AXLE SUSPENSION

Harvey B. Van Raden, Portland, Oreg., assignor to Ne Peer Company, Portland, Oreg., a copartnership Application February 13, 1953, Serial No. 336,779

6 Claims. (Cl. 280—104.5)

My present invention relates to tandem axle suspensions for automotive vehicles and trailers such as trucks, truck tractors, logging trailers, tank trailers, vans, and other vehicles designed for long trips and heavy duty, and which are often loaded when set on trips but return in an unloaded condition. It is a problem with such vehicles properly to protect the vehicle from road shocks, since the spring suspension means ordinarily employed in such a vehicle must be strong enough resiliently to support the vehicle when fully loaded, and yet limber enough to prevent the transmission of road shocks to the body of the vehicle when it is empty. One solution to this problem which is commonly encountered, yet which is at best a makeshift and is quite expensive, is to employ two leaf springs in place of the one ordinarily encountered, a limber leaf spring supporting the unloaded body, and a relatively rigid leaf spring which is brought into play when the vehicle is loaded. This solution has, in addition to the drawbacks noted above, the further drawback that the limber spring may be flexed beyond a desired amount in order to render the heavy spring effective, and under intermediate loads there is a continual clash of effects of the two springs as the limber spring flexes due to road shocks. The present invention overcomes and solves the above difficulties by the employment of a single spring adjacent each end of a transverse wheel mounting member, such as an axle or spindle mounting member, one end of the spring being firmly but resiliently mounted so as to fix the wheel mounting member in longitudinal relation to the vehicle, and the other end of the spring being associated with a diverging pressure pad, the spring and the parts adjacent each other being so arranged that the effective length and resiliency of the spring are greatest when the vehicle is lightly loaded, and progressively decrease as the vehicle load increases.

Another aspect of the present invention is to provide a tandem axle suspension embodying a pair of transverse wheel mounting members, each of which is mounted upon a pair of springs as described above, the outer ends of the springs being anchored resiliently to the body of the vehicle whereby to fix the longitudinal relationship of the wheel mounting members with respect to the body, and the inner ends of the springs being associated with diverging pressure pads at the ends of a centrally mounted rocker assembly whereby, in addition to the result noted above, extreme road shocks transmitted to one wheel mounting member are reduced by partially transmitting the shock to the other wheel mounting member.

A further object of the present invention is to provide apparatus of the character described which comprises sturdy, relatively inexpensive, easily assembled parts which may be easily replaced in the event of damage.

The objects and advantages of the present invention will be more readily understood by reference to the accompanying drawings taken in connection with the following specification wherein like numerals refer to like parts throughout, and in which a preferred form of the invention is illustrated and described.

Referring to the drawings,

Fig. 1 is a view in side elevation, partly broken away, illustrating a tandem axle suspension embodying the present invention;

Fig. 2 is a horizontal section taken substantially along line 2—2 of Fig. 1;

Fig. 3 is a vertical section taken substantially along line 3—3 of Fig. 1;

Fig. 4 is a vertical section, on an enlarged scale, of a portion of the rocker assembly, the view being taken substantially along line 4—4 of Fig. 2;

Fig. 5 is a side elevation of a split sleeve employed in the rocker assembly;

Fig. 6 is an end view of Fig. 5;

Fig. 7 is an enlarged view, partially broken away, of a saddle assembly for attaching a spring to a wheel mounting member;

Fig. 8 is a vertical section, on an enlarged scale, taken substantially along line 8—8 of Fig. 1;

Fig. 9 is a plan view of a resilient pad forming member employed in the present invention;

Fig. 10 is a side elevation of Fig. 9;

Fig. 11 is a plan view of a pan employed in the present invention;

Fig. 12 is a vertical section taken substantially along line 12—12 of Fig. 11; and Fig. 13 is a side elevation, partly in section, on an enlarged scale, illustrating the relationship between a spring, a pair of pans and the pad forming member prior to compression of the latter in a housing for attaching the spring end to the body of a vehicle.

In Fig. 1 the assembly is shown as comprising a pair of leaf springs 10 mounted upon a longitudinal frame member 11 of the body of the vehicle and supporting a pair of elongated transverse wheel mounting members indicated at 12, the latter extending transversely of the vehicle and being representative of spindle mounting members or axle housings and at the opposite ends of each of which a pair of wheels may be mounted. The springs are mounted upon the frame member by spring shackle assemblies 13 at the outer ends of the springs and a rocker assembly 14 mounted midway between the spring shackle assemblies 13. Each spring comprises a plurality of spring leaves, with the longest leaf 15 being uppermost and each succeeding leaf being of progressively shorter length, and the springs are bowed downwardly, particularly when the vehicle is unloaded. The inner adjacent ends of the upper spring leaves 15 are each provided with a downwardly projecting hook indicated at 16, and each of the two next lower spring leaves, 17 and 18, have their outer ends ending adjacent the outer ends of the upper spring leaves 15 and their inner ends progressively shorter, as seen most clearly in Fig. 1. Preferably, a plurality of clamps 19 are applied to the springs at intermediate positions between the shackle assemblies and the wheel mounting members and between the rocker assembly and the wheel mounting members.

A preferred form of shackle assembly (Figs. 1 and 8 to 13 inclusive) comprises an upper housing portion 20 having a vertical part adapted to be attached to the vertical portion of the frame member 11 by separable means such as bolts 21 and nuts 22, and a horizontal portion bearing against the horizontal lower flange of the frame member. The lower surface of the portion 20 provides a dished upper housing wall 23. The side walls 24 and 25 of the housing and the bottom wall 26 thereof, as well as the outer wall 27, are provided by a separable housing part 28 which is drawn into cooperative relation with the upper housing part by vertical threaded means such as bolts 29 and nuts 30. The housing so provided has an opening 31 therein into which the outer ends of each of the three upper leaves 15, 17 and 18 project.

A pair of pad seating pans 32 are mounted upon each spring end within the housing provided by the parts 20 and 28, one facing upwardly and seated upon the upper surface of the spring leaf 15 and the other facing downwardly and seated upon the lower surface of the spring leaf 18. The pans are each retained in position by a cylindrical plug 33 welded centrally thereof and snugly received in a hole bored through the adjacent spring leaf. Each pan seats a resilient pad comprising part of a pad forming member including an upper resilient pad 34, an intermediate end pad 35 and a lower pad 36, the pads being integrally connected together by resilient connecting portions. The pads are so shaped with relation to the space within the separable housings that the extreme tips of the springs are most firmly gripped under light loading and the effective length thereof is, accordingly, relatively long. However, as the load on the vehicle increases and the spring tends to flex toward a horizontal position, the effective point of application of the load travels along the spring toward the opening 31, thereby shortening the effective length of the spring and increasing its effective strength. The operation and details of the spring end shackle 13 are more fully illustrated, described and claimed in my copending application, Serial No. 336,777, executed concurrently herewith. It is to be appreciated that other forms of spring end shackles fixing the end of the spring longitudinally with respect to the vehicle and achieving the same objects and advantages may be substituted in the present invention.

The transverse wheel mounting members 12 are each connected to the under side of a laterally spaced pair of springs 10 by means comprising an adjustable saddle assembly 37 (Figs. 1 and 7). The saddle assembly comprises a base 38 which is welded to the upper surface of the member 12 and is provided with an opening in its upper, substantially horizontal surface. The base is provided with a plurality of horizontal, apertured ears through which pass the vertical legs of a pair of U-bolts 39. The U-bolts embrace upper portions of a saddle member 40 and straddle the leaves of the springs, the legs of the U-bolts extending through apertured ears in a lower, separable clamp 41 and are engaged by nuts 42 whereby the U-bolts may be tightened to clamp the spring to the transverse members 12. An adjusting plate 43 is seated upon the base 38 and is provided with a pair of lugs 44 projecting into the open upper end thereof in spaced relation to the fore and aft walls thereof. The plate, and each succeeding spring leaf thereabove, is provided with aligned depressions 45, into which project downwardly displaced portions 46 of the leaf springs whereby each of the leaf springs and plate 43 is centrally fixed with respect to each other. The lugs 44 are oppositely engaged by the inner ends of longitudinally extending adjusting screws 47 upon which are mounted lock nuts 48. The adjustable saddle assembly provides means whereby one of the last steps in assembling a vehicle may be the exact positioning of the transverse members 12 at right angles to the longitudinal axis of the vehicle so that the vehicle will run true. Adjustment is accomplished by loosening the clamping nuts 42, backing off one of the adjusting screws 47 and tightening the other. The adjustable saddle assembly is more completely illustrated, described and claimed in the copending application of Frederick F. Van Raden, Serial No. 336,819, executed concurrently herewith. It is to be appreciated that other similar means achieving the same advantages and purposes may be substituted in the present assembly.

The rocker assembly 14 of the present invention is illustrated in Figs. 1 to 6, inclusive, and comprises the following: A support comprising a split housing including an upper portion 49 and a lower portion 50 is mounted upon the frame member 11 by means such as bolts 51 and nuts 52. The portion 49 comprises an upper, downwardly facing, semicylindrical housing part 53 and the lower portion 50 comprises an upwardly facing, complementary, semicylindrical housing portion 54, the two parts having horizontal flanges meeting along a horizontal diameter whereby they may be connected together by vertical bolts 55 and cooperating nuts 56. The axis of the cylindrical space thus provided is midway between the adjacent inner ends of the springs along a transverse horizontal line.

A rocker comprising a pair of side arms 57 and an integral, transverse, central trunnion 58 is mounted in the support, the mounting means comprising a resilient sleeve 59 compressed between the portions 53 and 54 and the trunnion 58. The sleeve 59 must be longitudinally split at least once so that it may be passed about the trunnion 58, preferably the sleeve comprising two portions 60 hinged together by providing a notch 61 longitudinally thereof diametrically opposite the meeting edges of the two portions indicated at 62. The sleeve is preferably slightly thicker than the difference between the external radius of the trunnion 58 and the internal radius of the housing whereby the bolts 55, upon being drawn tight to their fullest extent, will compress the resilient sleeve and cause portions thereof to flow into longitudinal grooves or depressions 63 in the internal surface of the housing and longitudinal grooves or depressions 64 in the external surface of the trunnion. By reason of this construction the sleeve is not only compressed but caused firmly to grip the trunnion and resist rocking movement of the rocker. As seen in Figs. 2 and 3 the ends of the portions 53 and 54 are provided with inwardly projecting flanges whereby the tendency of the sleeve to be distorted outwardly from its confining space is reduced to a minimum. Preferably the meeting inner edges of the portions 53 and 54 are chamfered to provide grooves 65 into which the material of the sleeve may flow without preventing the bolts 55 and nuts 56 from being tightened to their fullest extent.

The side arms 57 extend to equal distances on opposite sides of the pivot provided by the trunnion 58 and are provided with integral connecting portions 66 at each end, the lower surfaces 67 of which lie substantially horizontal but are convex and extend longitudinally above the inner ends of the leaves 15 whereby the adjacent surfaces curvedly diverge outwardly from the rocker assembly. When the vehicle is lightly loaded the area of contact of the surface 67 with the spring is immediately above the hook 16 at the extreme tip of the leaf, thereby causing the spring to have a maximum effective length and maximum effective resiliency. However, as loading of the vehicle progresses the area of contact of the surface 67 and the spring progressively moves outwardly from the trunnion, thereby progressively decreasing the effective length of the spring and progressively decreasing its resiliency.

As a last step in assembly, a bolt 68 is fixed between the side arms 57 transversely of the space beneath the end of the leaf spring. This bolt acts as a safety device to prevent extremes of relative movement of one wheel mounting member with respect to the other from permitting a spring end to become disengaged from the rocker assembly.

It should be apparent that in operation each spring end supports the load at its extreme tip under light loading and that as the loading increases the effective length and resiliency of the springs are proportionately decreased. Furthermore, as relative vertical movement may occur between the two wheel mounting members 12 by reason of the wheels traversing uneven ground or bouncing over obstructions, the shock created thereby is minimized since a portion thereof is transmitted from one spring to the other through the rocker assembly.

Having illustrated and described a preferred embodiment of the present invention, it should be apparent to

I claim:

1. A vehicle comprising a pair of elongated, transverse, wheel mounting members extending parallel to each other at right angles to the longitudinal direction of the vehicle, a pair of leaf springs extending in longitudinal alignment with each other in the longitudinal direction of the vehicle and having their adjacent ends separated from each other, means fixedly connecting central portions of said leaf springs respectively to said transverse members, shackle means gripping and securing the remote ends of said leaf springs against longitudinal movement with respect to the vehicle, said shackle means each comprising a pair of resilient pads positioned respectively above and below said remote ends and means to retain said pads under compression gripping the tips of the remote ends most firmly under light loading and gripping the springs firmly progressively toward the centers of the springs as the load increases whereby the effective length of each of said springs is greatest under light loading and progressively decreases as the load increases, a support mounted on the vehicle midway between the adjacent ends of said leaf springs, and a rocker pivotally mounted on said support for rocking movement about a horizontal axis at right angles to the longitudinal direction of the vehicle, said rocker having opposed arms extending in the longitudinal direction of the vehicle and bearing respectively upon the upper surfaces of the adjacent ends of said leaf springs.

2. A vehicle comprising a pair of elongated, transverse, wheel mounting members extending parallel to each other at right angles to the longitudinal direction of the vehicle, a pair of leaf springs extending in longitudinal alignment with each other in the longitudinal direction of the vehicle and having their adjacent ends separated from each other, means fixedly connecting central portions of said leaf springs respectively to said transverse members, shackle means gripping and securing the remote ends of said leaf springs against longitudinal movement with respect to the vehicle, said shackle means each comprising a pair of resilient pads positioned respectively above and below said remote ends and means to retain said pads under compression gripping the tips of the remote ends most firmly under light loading and gripping the springs firmly progressively towards the centers of the springs as the load increases whereby the effective length of each of said springs is greatest under light loading and progressively decreases as the load increases, a support mounted on the vehicle midway between the adjacent ends of said leaf springs, and a rocker pivotally mounted on said support for rocking movement about a horizontal axis at right angles to the longitudinal direction of the vehicle, said rocker having opposed arms extending in the longitudinal direction of the vehicle and including end portions bearing respectively upon and overlying the upper surfaces of the adjacent ends of said leaf springs, said portions being of substantial length in the longitudinal direction of the vehicle, and the adjacent surfaces of said portions and the leaf springs curvedly diverging outwardly from said support whereby the effective length of each of said springs is greatest under light loading and progressively decreases as the load increases.

3. A vehicle comprising a pair of elongated, transverse, wheel mountinig members extending parallel to each other at right angles to the longitudinal direction of the vehicle, a pair of leaf springs extending in longitudinal alignment with each other in the longitudinal direction of the vehicle and having their adjacent ends separated from each other, means fixedly connecting central portions of said leaf springs respectively to said transverse members, shackle means gripping and securing the remote ends of said leaf springs against longitudinal movement with respect to the vehicle, said shackle means each comprising a pair of resilient pads positioned respectively above and below said remote ends and means to retain said pads under compression gripping the tips of the remote ends most firmly under light loading and gripping the springs firmly progressively toward the centers of the springs as the load increases whereby the effective length of each of said springs is greatest under light loading and progressively decreases as the load increases, a support mounted on the vehicle midway between the adjacent ends of said leaf springs, and a rocker pivotally mounted on said support for rocking movement about a horizontal axis at right angles to the longitudinal direction of the vehicle, said rocker having opposed arms extending in the longitudinal direction of the vehicle and each having a portion at its end bearing respectively upon and overlying the upper surfaces of the adjacent ends of said leaf springs, said rocker comprising a pair of side plates embracing the sides of said adjacent leaf spring ends, and said portions being integral with said side plates and presenting curved lower surfaces progressively diverging from the upper surfaces of said leaf springs away from said support when the leaf springs are in normal position under light loading so that only the tips of the leaf springs are normally engaged, the area of contact of said portions and said leaf springs progressively moving outwardly from said support as the leaf springs flex under progressively increasing loads.

4. A vehicle comprising a pair of elongated, transverse, wheel mounting members extending parallel to each other at right angles to the longitudinal direction of the vehicle, a pair of leaf springs extending in longitudinal alignment with each other in the longitudinal direction of the vehicle and having their adjacent ends separated from each other, means fixedly connecting central portions of said leaf springs respectively to said transverse members, shackle means gripping and securing the remote ends of said leaf springs against longitudinal movement with respect to the vehicle, said shackle means each comprising a pair of resilient pads positioned respectively above and below said remote ends and means to retain said pads under compression gripping the tips of the remote ends most firmly under light loading and gripping the springs firmly progressively towards the centers of the springs as the load increases whereby the effective length of each of said springs is greatest under light loading and progressively decreases as the load increases, a support mounted on the vehicle midway between the adjacent ends of said leaf springs, and a rocker pivotally mounted on said support for rocking movement about a horizontal axis at right angles to the longitudinal direction of the vehicle, said rocker having opposed arms extending in the longitudinal direction of the vehicle and each having a portion at its end bearing respectively upon the upper surfaces of the adjacent ends of said leaf springs, and resilient means biased between said support and said rocker resiliently to oppose rocking movement of said rocker, said rocker comprising an integral trunnion and said support comprising a split housing concentrically surrounding said trunnion in spaced relation thereto, and said resilient means comprising a bushing of rubberous material radially compressed between said housing and said trunnion and torsionally resisting relative rotation thereof.

5. A vehicle comprising a pair of elongated, transverse, wheel mounting members extending parallel to each other at right angles to the longitudinal direction of the vehicle, a pair of leaf springs extending in longitudinal alignment with each other in the longitudinal direction of the vehicle and having their adjacent ends separated from each other, means fixedly connecting central portions of said leaf springs respectively to said transverse members, a pair of shackle means respectively gripping and securing the remote ends of said leaf springs against longitudinal movement with respect to the vehicle, each of said shackle means comprising a pair of resilient pads positioned respectively above and below each of said remote ends and means to retain said pads under compression gripping the tips of the remote ends most firmly under light loading and gripping the springs firmly progressively toward the centers of the springs as the load increases whereby the effective length of each of said springs is greatest under light loading and progressively decreases as the load increases, a support mounted on the vehicle midway between the adjacent ends of said leaf springs, a rocker pivotally mounted on said support for rocking movement about a horizontal axis at right angles to the longitudinal direction of the vehicle, said rocker having opposed arms extending in the longitudinal direction of the vehicle and each having a portion at its end bearing respectively upon the upper surfaces of the adjacent ends of said leaf springs, resilient means biased between said support and said rocker resiliently to oppose rocking movement of said rocker, said rocker comprising an integral trunnion and said support comport comprising a split housing concentrically surrounding said trunnion in spaced relation thereto, said resilient means comprising a bushing of rubberous material radially compressed between said housing and said trunnion and torsionally resisting relative rotation thereof, and said support comprising an upper part having a semicylindrical lower surface, a separable lower part having a semicylindrical upper surface, said parts having opposed flanges meeting along a diametrical plane and the junctive edges of said flanges with said semicylindrical surfaces being chamfered, and bolt means extending through said flanges to hold said parts together.

6. A vehicle comprising a pair of elongated, transverse, wheel mounting members extending parallel to each other at right angles to the longitudinal direction of the vehicle, a pair of leaf springs extending in longitudinal alignment with each other in the longitudinal direction of the vehicle and having their adjacent ends separated from each other, means fixedly connecting central portions of said leaf springs respectively to said transverse members, a pair of shackle means respectively gripping and securing the remote ends of said leaf springs against longitudinal movement with respect to the vehicle, said shackle means each comprising a pair of resilient pads positioned respectively above and below each of said remote ends and means to retain said pads under compression gripping the tips of the remote ends most firmly under light loading and gripping the springs firmly progressively toward the centers of the springs as the load increases whereby the effective length of each of said springs is greatest under light loading and progressively decreases as the load increases, a support mounted on the vehicle midway between the adjacent ends of said leaf springs, a rocker pivotally mounted on said support for rocking movement about a horizontal axis at right angles to the longitudinal direction of the vehicle, said rocker having opposed arms extending in the longitudinal direction of the vehicle and each having a portion at its end bearing respectively upon the upper surfaces of the adjacent ends of said leaf springs, resilient means biased between said support and said rocker resiliently to oppose rocking movement of said rocker, said rocker comprising an integral trunnion and said support comprising a split housing concentrically surrounding said trunnion in spaced relation thereto, said resilient means comprising a bushing of rubberous material radially compressed between said housing and said trunnion and torsionally resisting relative rotation thereof, said support comprising an upper part having a semicylindrical lower surface, a separable lower part having a semicylindrical upper surface, said surfaces having equal radii, said surfaces having a plurality of slight depressions therein and said parts being chamfered along their meeting edges to define grooves when brought together, said bushing comprising a longitudinally split cylindrical sleeve of uniform radial thickness throughout almost all of its extent, the normal radial thickness of said sleeve being slightly greater than the radial distance between the outer surface of said trunnion and the cylindrical surfaces of said support parts, and said sleeve having smooth surfaces when in uncompressed condition, the total volume of said bushing being such that portions thereof are deformed into said depressions and grooves when the housing portions are brought together, and bolt means to bring said housing parts together.

References Cited in the file of this patent

UNITED STATES PATENTS

| | | |
|---|---|---|
| 1,496,237 | Leipert | June 3, 1924 |
| 1,745,431 | Marcum | Feb. 4, 1930 |
| 2,318,257 | Peterman | May 4, 1943 |
| 2,481,891 | Van Raden | Sept. 13, 1949 |
| 2,577,322 | Frazier | Dec. 4, 1951 |